Nov. 24, 1931.  D. R. JOHNSON  1,833,837
SELF ADJUSTABLE BRAKE FOR VEHICLES
Filed Aug. 7, 1930   2 Sheets-Sheet 2
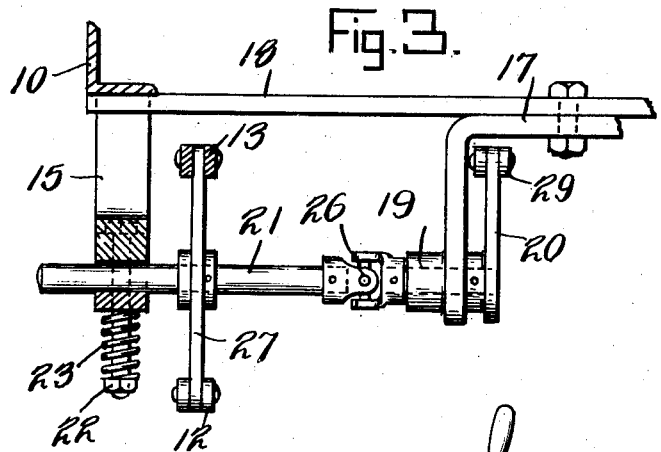
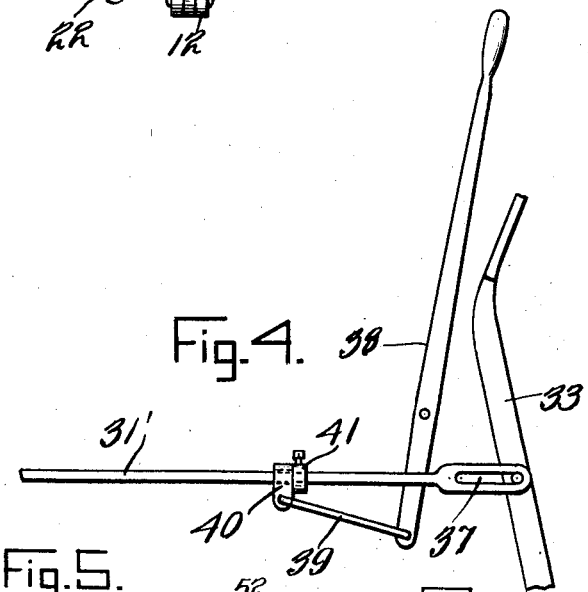
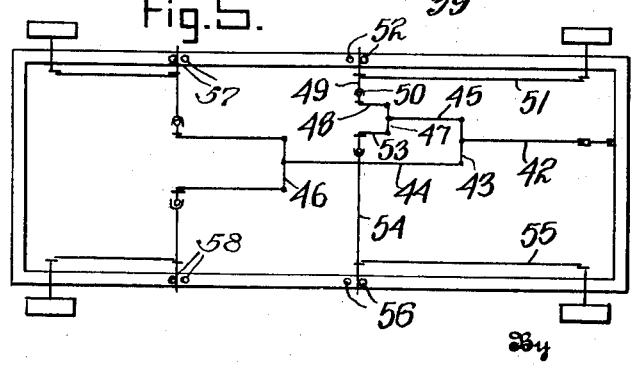
Inventor
Dayton R. Johnson
Attorney Patented Nov. 24, 1931

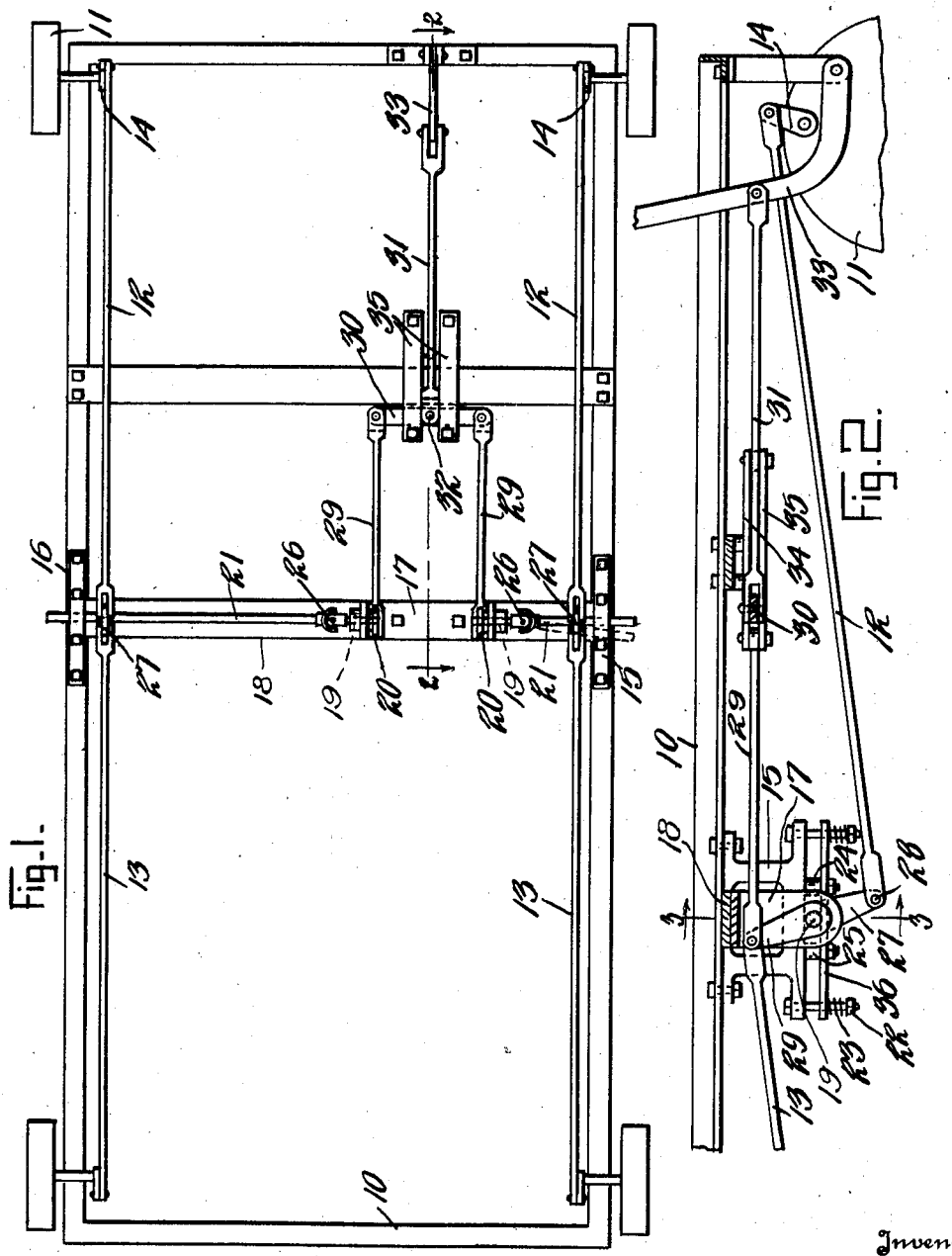

1,833,837

UNITED STATES PATENT OFFICE

DAYTON R. JOHNSON, OF SANFORD, FLORIDA, ASSIGNOR OF ONE-THIRD TO ELLA V. SLADE, OF LONGWOOD, FLORIDA, ONE-THIRD TO CHARLES D. FORRESTER, OF SANFORD, FLORIDA, AND ONE-THIRD TO HIMSELF

SELF-ADJUSTABLE BRAKE FOR VEHICLES

Application filed August 7, 1930. Serial No. 473,623.

This invention relates to mechanical braking mechanism and is designed particularly with a view to its use on four wheel brakes of motor vehicles.

An object of the invention is to provide a brake mechanism which will equalize pressure on each of the four wheel brakes of the vehicle.

A further object is to provide means whereby the remaining brakes will operate when one or more of the operative connections between the brake pedal and the brake drums becomes disconnected or broken.

Further objects and advantages will become apparent as the description proceeds.

Referring to the accompanying drawings, which are made a part hereof and on which similar reference characters indicate similar parts, Figure 1 is an inverted plan view, Figure 2, a section on line 2—2 of Figure 1, Figure 3, a section on line 3—3 of Figure 2, Figure 4, a detail view of a modified form of operating mechanism, and Figure 5, a diagrammatic plan view of a modified form of the invention.

In the drawings numeral 10 indicates the frame of an automobile upon which the braking mechanism is mounted, and 11 indicates the brake drums of usual or known construction. The brake bands are operated by means of rods 12 and 13 connected to brackets 14. Suitably mounted on the side portions of the frame are brackets 15 and 16. A bracket 17 is mounted on a cross piece 18 of the automobile frame. Shafts 19 are journaled in bearings in the bracket 17 and these shafts carry on their inner ends arms 20. Shafts 21 are mounted on the brackets 15 and are held in position by means of bars 36. The bars 36 are held to the brackets 15 by means of springs 23 so that the bar 36 is held resiliently against the ends of the shafts 21 to take up any lost motion between the shaft and the bracket for eliminating rattling.

The tension on the springs 23 may be controlled by nuts 22. Posts 24 and 25 are spaced from the shaft 21 to permit this shaft to have a certain longitudinal movement in the slot formed between the bar 36 and the bottom of the bracket 15. A universal joint 26 connects the shaft 21 with the outer end of the shafts 19. This permits the outer end of the shaft 21 to move longitudinally of the frame. Secured to the shafts 21 are arms 27 to the outer ends of which the rods 12 and 13 are attached. The ends of these rods may be detachably secured by means of bolts 28 carrying cotter pins so that the rods may be detached for a purpose which will later appear.

To the arms 20 are attached links 29 which are connected at their other ends to the opposite ends of a rock lever 30. A link 31 is connected at 32 intermediate the ends of the lever 30 and connected at its other end to a brake pedal 33. The rock lever 30 is held between upper and lower brackets 34 and 35 so as to be permitted to slide longitudinally of the brackets.

The operation of the device should be apparent from the foregoing description. The operator applies pressure to the brake pedal 33 and this pulls the rods 29 forward by means of the rock lever 30. Since the link 31 is connected at the central point of the lever 30, equal strain will be applied to each of the links 29, and this rotates the shafts 19 and 21 to pull the links 12 and 13 toward the center of the motor vehicle and apply the brakes. Since the shafts 21 may float in the slots between the bars 27 and the lower sides of the brackets 15 equal pressure will be applied to the front and rear brake drums due to the universal joint connections 26. If for any reason one of the links 12 or 13 should become broken or disconnected the shaft 21 will strike against one of the stop pins 24 and 25 so that rotation of the shaft 21 will apply pressure to the corresponding brake on that side of the motor vehicle. Three brakes therefore will be operated even though the connection to one of the brake drums is broken. Since the operator might not desire to operate his car with two brakes on one side and only one on the other after one connection becomes broken, he may disconnect the corresponding rod on the opposite side of the automobile by removing the pin 28 whereupon the vehicle will be operated by two brakes only, one on each side of the vehicle. It will therefore be seen from the description and the operation that equal pressure is applied to all of the brakes of the vehicle during normal operation and that in case of an accident to one of the braking connections the other three will function.

It may be desirable to apply the brakes by a hand operated lever in lieu of the brake pedal. As shown in Fig. 4 therefore the link 31' may have a slotted connection, as shown at 37, with the brake pedal, and a hand lever 38 may be connected by means of a link 39 and a slidable collar 40 to operate link 31', a stop collar 41 being provided on the link 31 by means of which the link is moved. The slot 37 permits free movement of the link 31 without affecting the brake pedal 33.

Figure 5 illustrates a modified form of the braking system in which means are provided for automatically releasing pressure on the opposite brake drum when the connection to one of the drums becomes broken or otherwise defective. In this form of the invention a link 42 is connected to the brake pedal at one end and at its other end intermediate the lever 43. Links 44 and 45 connect opposite ends of this lever with the intermediate point on rock levers 46 and 47 which control the rear and front brakes respectively. The operative connection from the levers 46 and 47 with the brake drums in each case is the same so only one need be described. A link 48 is the same so only one need be described. A link 48 is connected to an arm or lever 49. The lever 49 has the universal or other flexible joint 50. A link 51 connects the lever 49 with the brake drum on one side of the car and stops 52 limit forward and backward movement of the lever 49. On the opposite side of the car a link 53 connects the lever 47 with an arm on the lever 54. A link 55 connects the outer end of the lever with the brake drum on the right side of the car and stops 56 limit forward and backward movement of the outer end of lever 54. In this form of the invention if the link 51 becomes disconnected it will allow the link 48 to be pulled forward allowing the lever 47 to swing on its pivot with the link 45, allowing the other end of the lever 47 to move to the rear which in turn releases the tension on the link 55 and therefore release pressure on the brake drum on the opposite side of the automobile. Similar stops 57 and 58 are provided for the rear brakes. Stops 52, 56, 57 and 58 are similar in construction to stops 24 and 25 in Figure 2. In this form of the invention therefore, the brake drum on the opposite side of the car is automatically released of its pressure when its mate on the opposite side has pressure released from it. This insures that equal pressure will be applied to both sides of the automobile, in case one of the braking connections with one of the brake drums becomes defective and avoids the danger of having the car swerve when the brakes are applied and one of the connections suddenly breaks.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. A brake system for motor vehicles comprising the combination with the frame of the vehicle of a set of brake drums, a brake pedal, brackets secured to the said frame, shafts mounted in said brackets and having arms secured thereon, connecting links between said arms and the said brake drums whereby rotation of the shafts will apply the brake drums, and means connecting said shafts with the brake pedal for rotating them to apply the brakes, said shafts having universal joint connections intermediate their ends to permit one end of the shaft to have a floating action with respect to the remainder of the shaft, the said links being connected to this end whereby rotation of the shaft applies equal pressure to the front and rear brake drums, substantially as set forth.

2. A brake system for motor vehicles comprising the combination with the frame of the vehicle of a set of brake drums, a brake pedal, brackets secured to the said frame, shafts mounted in said brackets and having arms secured thereon, connecting links between said arms and the said brake drums whereby rotation of the shafts will apply the brake drums, means connecting said shafts with the brake pedal for rotating them to apply the brakes, said shafts having universal joint connections intermediate their ends to permit one end of the shaft to have a floating action with respect to the remainder of the shaft, the said links being connected to this end whereby rotation of the shaft applies equal pressure to the front and rear brake drums, and means for taking up lost motion to eliminate rattling of the shafts in the brackets, substantially as set forth.

3. A brake system for motor vehicles comprising the combination with the frame of the vehicle of a set of brake drums, a brake pedal, shafts rotatably secured to said frame and provided with arms fixed thereon, a connecting link between said pedal and said shafts, connecting links between said arms and said brake drums, said shafts being provided with flexible connections intermediate their ends to permit the outer end thereof to move horizontally with respect to the remainder of the shaft whereby upon rotation of said shafts equal pressure is applied to the brake drums, substantially as set forth.

In witness whereof, I have hereunto set my hand at Washington, District of Columbia, this seventh day of August, A. D. nineteen hundred and thirty.

DAYTON R. JOHNSON.